(12) United States Patent
McCullough et al.

(10) Patent No.: US 10,764,122 B2
(45) Date of Patent: Sep. 1, 2020

(54) MANAGING COMPUTING INFRASTRUCTURE EVENTS HAVING DIFFERENT EVENT NOTIFICATION FORMATS

(71) Applicant: Red Hat, Inc., Raleigh, NC (US)

(72) Inventors: Gregory McCullough, Kinnelon, NJ (US); Jason Frey, Cedar Knolls, NJ (US); Oleg Barenboim, Englewood Cliffs, NJ (US); Lianhua Fu, Montville, NJ (US)

(73) Assignee: Red Hat, Inc., Raleigh, NC (US)

( * ) Notice: Subject to any disclaimer, the term of this patent is extended or adjusted under 35 U.S.C. 154(b) by 327 days.

(21) Appl. No.: 15/055,163

(22) Filed: Feb. 26, 2016

(65) Prior Publication Data

US 2017/0250857 A1 Aug. 31, 2017

(51) Int. Cl.
*H04L 12/24* (2006.01)
*H04L 29/08* (2006.01)

(52) U.S. Cl.
CPC ...... *H04L 41/0686* (2013.01); *H04L 41/0226* (2013.01); *H04L 41/069* (2013.01); *H04L 67/1097* (2013.01)

(58) Field of Classification Search
CPC .................................................. H04L 67/1097
USPC ....................................................... 709/224
See application file for complete search history.

(56) References Cited

U.S. PATENT DOCUMENTS

| 7,062,681 | B2 | 6/2006 | Larsson et al. |
| 7,979,850 | B2 | 7/2011 | Ivanov et al. |
| 7,984,452 | B2 | 7/2011 | Chakravarty et al. |
| 8,234,704 | B2 | 7/2012 | Ghai et al. |
| 8,577,829 | B2 | 11/2013 | Subrahman yam et al. |
| 8,630,613 | B2 | 1/2014 | Lisi et al. |
| 8,799,722 | B2 | 8/2014 | Neuhaus et al. |
| 8,949,169 | B2 | 2/2015 | Shelton et al. |
| 9,137,258 | B2 | 9/2015 | Haugsnes |
| 2012/0284221 | A1* | 11/2012 | Shelton ............... H04L 41/0636 706/47 |
| 2015/0081885 | A1* | 3/2015 | Thomas ............... G06F 9/45558 709/224 |
| 2017/0134226 | A1* | 5/2017 | Ilic ........................ H04L 43/16 |

OTHER PUBLICATIONS

"Chapter 3. Enhancements", <access.redhat.com/documentation/en/red-hat-cloudforms/4.0/release-notes/chapter-3-enhancements>, downloaded on Nov. 27, 2015, 5 pages.

* cited by examiner

Primary Examiner — SM A Rahman
Assistant Examiner — Emad Siddiqi
(74) Attorney, Agent, or Firm — Lowenstein Sandler LLP

(57) ABSTRACT

A processing device receives event notifications for occurrences of infrastructure events from a different event sources. The event notifications have different formats to represent a same type of infrastructure event. The processing device creates uniform event notifications from a base event format for the event notifications, and provides the uniform event notifications to a centralized event handler that corresponds to the base event format within a threshold amount of time to allow a time sensitive action to be performed by the centralized event handler within a time period.

20 Claims, 7 Drawing Sheets

MANAGING COMPUTING INFRASTRUCTURE EVENTS HAVING DIFFERENT EVENT NOTIFICATION FORMATS

TECHNICAL FIELD

The present disclosure relates to computing infrastructure events, and more particularly, to managing computing infrastructure events having different event notification formats.

BACKGROUND

Computing infrastructures, such as storage systems, virtualization systems, and networking systems, can be provided as resources via data centers and/or cloud computing environments. Various infrastructure events may occur for the resources (e.g., physical resources, virtual resources), such as, creating a resource, provisioning a resource, running a resource, de-provisioning a resource, etc. Event notifications can be generated for the infrastructure events. The notifications may be generated by different cloud providers and/or data centers, and typically have different formats and parameters from each other. The various formats of the event notifications generally make the processing of the notifications difficult. Conventional event handling solutions may include custom logic for each of the different formats for processing the various notification formats. The creation of such custom logic usually takes a significant amount of development time, which can make it difficult to support new event sources that may generate event notifications. When the custom logic is implemented using traditional solutions, the processing of the various event notification formats can be complicated and time consuming, which can cause a time delay from when the event occurs and when an event notification is processed. The delay can cause time sensitive actions that should be performed in response to the event occurrences from not being performed as expected.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
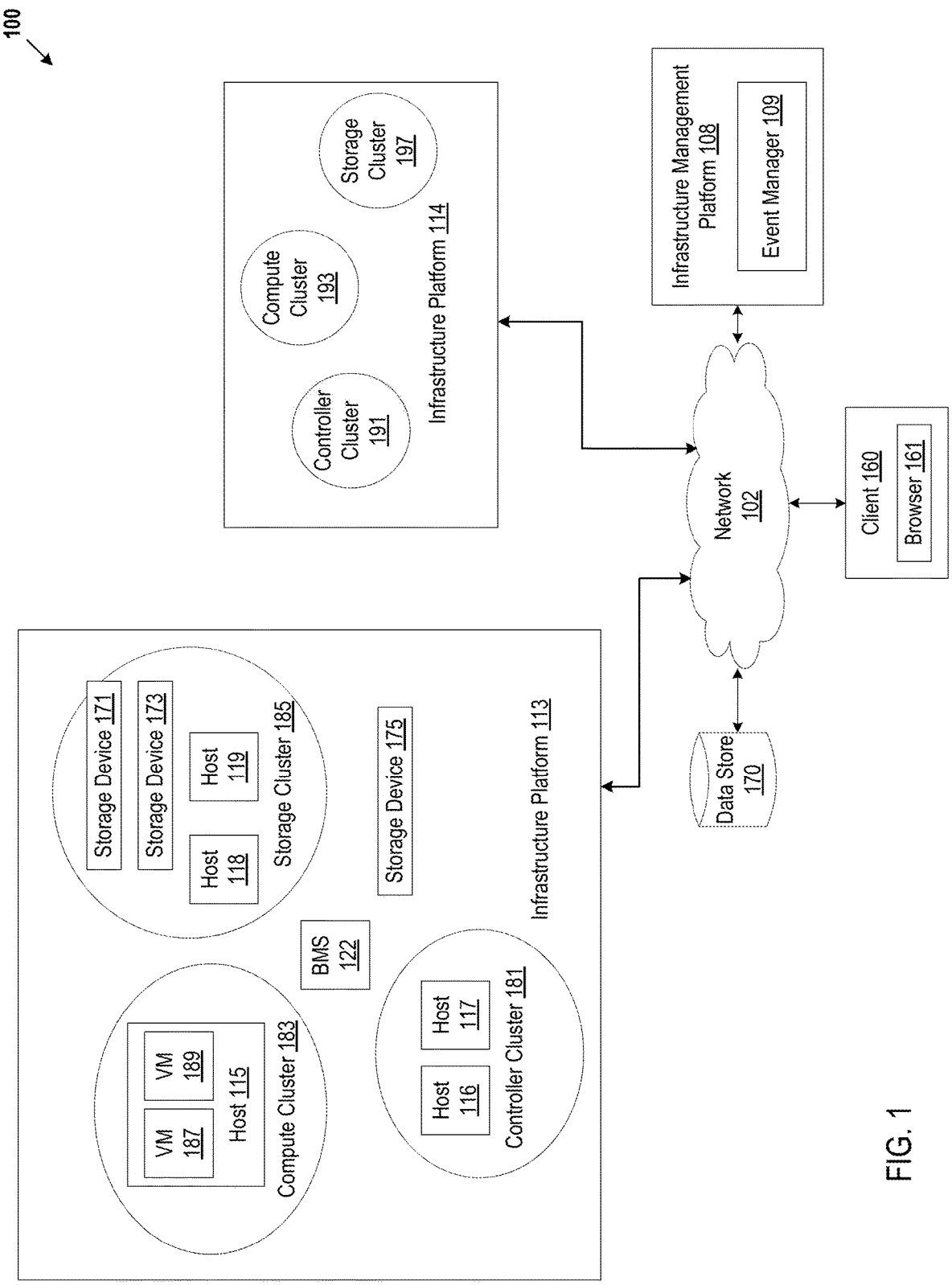
FIG. 1 is an example system architecture in which implementations of the present disclosure can be implemented.

Aspects and implementations of the present disclosure are directed to managing computing infrastructure events having different event notification formats. A computing infrastructure can be a data center or a cloud, and can include a non-virtual layer and a virtual layer. The virtual layer can include virtual resources, such as virtual machines (VMs), containers, and virtual storage. The non-virtual layer can include physical resources, such as a bare metal system (BMS), host machines, and storage devices. A bare metal system is represented by a computing operating system running on physical hardware without a virtualization layer. Various computing infrastructure events may occur, such as, creating a resource, provisioning a resource, running a resource, suspending a resource, de-provisioning a resource, etc. Event notifications can be generated for the infrastructure events and may have different formats and parameters from each other.

There may be time sensitive actions, such as sending a notification, updating data, updating a graphical user interface (GUI), triggering a workflow, etc. that should be performed when an infrastructure event occurs. A time sensitive action is an action that should be performed within a specified time period. The action and/or time period can be configurable and/or user-defined, for example, by one or more policies. Conventional event handling solutions generally use custom logic for each of the different event notification formats to process the specific format, which can be a complicated and time consuming process. Traditional event handling solutions may cause a time delay between the occurrence of the event and the processing of the event notification, which can cause time sensitive actions that should be performed within an allotted time from not being performed within the expected time.

Aspects of the present disclosure can reduce the time from when an event occurs to processing an event notification to provide sufficient time for time sensitive actions to be performed within an allotted time. Aspects of the present disclosure can reduce the time by converting event notifications from the different formats into a common base event format. Unlike traditional solutions that have multiple event handlers for each of the different event formats for the same event, aspects of the present disclosure create and use a centralized event handler for event notifications for the same type of event, even when the event notifications are generated by different sources.

Traditional infrastructure management solutions typically take inventory of an infrastructure platform (e.g., cloud, data center) by communicating with each resource within the infrastructure platform to collect resource state data from each resource. Depending on the size of the environment (e.g., number of physical resources, number of virtual resources), conventional inventory scans generally take a significant amount of time, and the inventory data for the infrastructure platforms may not be accurate and up-to-date when infrastructure decisions (e.g., provisioning decisions, workload decisions, notification decisions, billing decisions, etc.) should be made. Aspects of the present disclosure can provide accurate and up-to-date inventory data when infrastructure decisions are made by using common base event formats and centralized event handlers for the event notifications to update the inventory data.

FIG. 1 is an example system architecture 100 in which implementations of the present disclosure can be implemented. The system architecture 100 can include one or more infrastructure platforms 113,114. The infrastructure platforms 113,114 can be implemented with one or more clouds, and/or one or more data centers. There can be a large number of infrastructure platforms 113, 114. For brevity and simplicity, two infrastructure platforms 113,114 (e.g., clouds, data centers) are illustrated and used as an example throughout this document. The infrastructure platforms 113, 114 can provide resources (e.g., compute resources, storage resources, network resources) to one or more entities. An entity, as referred to herein, can represent any software provider, service provider, a business organization such as a corporation, an educational institution such as a college and university, etc. For example, several sub-entities may be different departments within the same entity, such as an Enterprise company, and may store and access data in the infrastructure platform 113.

The infrastructure platforms 113,114 can be a data center, a private cloud, a public cloud, or a hybrid cloud. The resources provided by an infrastructure platform 113,114 can be virtual resources and/or physical resources. The resources can include virtual infrastructure component, physical infrastructure components, software defined networks, software defined storage, middle ware, and applications. The individual infrastructure platforms 113,114 can be a physical data center that includes physical computer racks ("racks") each of which has a large number of computers, network devices, and storage devices that are interconnected.

The infrastructure platforms 113,114 can be provided by, for example, the same or different infrastructure providers. For example, infrastructure platform 113 may be a cloud and may be provided by Cloud-Provider-A, and infrastructure platform 114 may be a data center that is being provided by Data-Center-Provider-A. An infrastructure provider (e.g., cloud provider, data center provider) can provide more than one infrastructure platform.

As described above, the infrastructure platforms 113,114 can include a non-virtual layer and a virtual layer. The virtual layer can include virtual resources, such as VMs 187,189 and containers. A container can refer to an isolated set of resources allocated to executing an application and/or process independent from other applications and/or processes. A virtual machine can be a software implementation of a machine (computer) that includes its own operating system (referred to as a guest operating system) and executes application programs.

The non-virtual layer can include physical resources, such as bare metal systems (e.g., BMS 122) and host machines ("host") (e.g., host machines 115-119). A bare metal system 122 is a computing operating system executing on physical computing hardware without a virtualization layer. Host machines 115-119 are physical computing machines that host software (e.g., applications, servers) and/or a virtualization layer. For example, host machine 115 is the underlying computing hardware that includes a hypervisor to host VMs 187,189. Individual bare metal systems and host machines can be a server computer system, a desktop computer or any other computing device.

The infrastructure platforms 113,114 can provide compute resources, storage resources, and/or network resources to entities. Compute resources can include processing devices, bare metal systems (e.g., BMS 122), virtual machines (e.g., VMs 187,189), software containers, host machines 115-119, applications, memory, hypervisors, etc. Storage resources can include, and are not limited to, storage servers, storage software, disks, data stores, software defined storage, etc. Network resources can be virtual network resources, software defined networks, etc.

An example of infrastructure platforms 113,114 can include and is not limited to Red Hat® OpenStack®. The cloud infrastructure platforms 113,114 can implement one or more clusters. Each cluster can be dedicated to performing one or more certain functions. A cluster hereinafter refers to a group of connected hosts that work together for one or more particular functions. For example, the infrastructure platform 113 can include a controller cluster 181, a compute cluster 183, and one or more storage clusters 185. Infrastructure platform 114 can include a controller cluster 191, a compute cluster 193, and one or more storage clusters 197. Examples of functions can include, and are not limited to, virtualization, storage, networking, etc. For example, the controller clusters 181,191 can include one or more host machines (e.g., host machines 110,112) that include network management software for managing networking infrastructure, APIs (application programming interfaces), and communications for respective infrastructure platforms 113,114.

The compute clusters 183,193 can include one or more host machines (e.g., host machine 115) for hosting virtual machines (e.g., virtual machines 187,189). There can be a large number of virtual machines, containers, and/or containers within virtual machines in the infrastructure platforms 113,114. For brevity and simplicity, two virtual machines (e.g., VMs 187,189) hosted by host machine 115 are used as examples in system architecture 100.

The individual storage clusters 185,197 can include one or more hosts and one or more storage devices to manage storage for the data in the infrastructure platforms 113, 114. For brevity and simplicity, two host machines 118,119, which can include storage servers, and two storage devices 171,173 in storage cluster 185 are used as examples in system architecture 100. For example, the storage cluster 185 can manage virtual hard drives on storage devices 171,173 for virtual machines 187,189 in the infrastructure platform 113. The storage devices 171,173 can create a storage array for storing data in the infrastructure platform 113.

The infrastructure platforms 113,114 can include one or more types of storage clusters. One type of storage cluster (e.g., storage cluster 185) can manage block storage for virtual disks, for example, for the virtual machines (e.g., VMs 187,189) in the compute cluster 183. Another type of storage cluster can manage object storage for files. Another type of storage cluster can manage both block storage and object storage in a single cluster for the virtual machines in the compute cluster.

Users can interact with applications executing on infrastructure resources, such as VMs 187,189 and storage servers on hosts 118,119, using client computer systems, such as client 160, via corresponding applications (e.g., web browser program 161). There can be a large number of clients. For brevity and simplicity, client 160 is used as an example in architecture 100. The client 160 can be connected to the one or more hosts 115-119 in the clusters (e.g., compute cluster 183, controller cluster 181, storage cluster 185) via a network 102. The client 160 can be a mobile device, a PDA, a laptop, a desktop computer, or any other computing device.

The infrastructure platforms 113,114 can be managed by an infrastructure management platform 108. The infrastructure management platform 108 can communicate with multiple cloud providers and/or data center providers, which can be third party systems. Examples of an infrastructure management platform 108 can include and are not limited to Red Hat® CloudForms and ManageIQ®. The infrastructure management platform 108 can manage infrastructures that have tree/graph based inventories, such as infrastructure platforms 113,114. The infrastructure platforms 113,114 can be coupled to the infrastructure management platform 108 via the network 102, which may be a private network (e.g., a local area network (LAN), a wide area network (WAN), intranet, or other similar private networks) or a public network (e.g., the Internet). The infrastructure management platform 108 can be hosted by one or more machines (e.g., server computers, desktop computers, etc.). The infrastructure management platform 108 can be maintained by a consumer, such as an Enterprise (e.g., business, company), of the infrastructure platform 108. In another implementation, the infrastructure management platform 108 can be maintained by a cloud provider or a data center provider. The infrastructure management platform 108 can be coupled to multiple infrastructure platforms 113,114 via one or more networks 102.

The infrastructure management platform 108 can add additional capabilities to the infrastructures platforms 113, 114. For example, the infrastructure management platform 108 can access policy data that is stored in a data store 170 to optimize workloads on resources of the infrastructures platforms 113,114 and can manage the deployment of resources (e.g., bare metal systems, hosts, virtual machines, containers, containers within VMs, storage devices, storage servers, etc.) in the infrastructures platforms 113, 114. The infrastructure management platform 108 can receive input, for example, from a system administrator via the client 160, requesting a resource (e.g., VM, container, host, bare metal system, storage device, virtual storage, etc.) to be deployed in one or more of the infrastructure platforms 113,114. A request can be for a large number of resources, and the infrastructure management platform 108 can receive a large number of requests.

A data store 170 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Various computing infrastructure events may occur. The events can pertain to the resources in the infrastructure platforms 113,114 and/or can be events that are triggered by the infrastructure management platform 108. Examples of events can include creating a resource, provisioning a resource, running a resource, suspending a resource, de-provisioning a resource, changing a state of a resource, etc. Event notifications can be generated for the infrastructure events and may have different formats and parameters from each other. The event notifications can be generated by the infrastructure platforms 113,114 and/or the infrastructure management platform 108.

The infrastructure management platform 108 can receive the event notifications and provide centralized event handling capability. The infrastructure management platform 108 can include an event manager 109 to transform the various event notifications for a particular type of event from the different formats into a common base event format to create uniform event notifications for the particular type of event. A base event format is a definition of components that should be included for creating a uniform event notification for a particular event type. The base event format can be used to normalize event notifications, which are for the same event type, but have different formats. A uniform event notification is an event notification for a particular event type that has a notification format of a corresponding event source (e.g., cloud, data center, infrastructure management platform) and has been transformed into an event notification having the base event format for the particular event type. A uniform event notification is a representation of an event occurrence of a particular event type from any event source (e.g., cloud, data center, infrastructure management platform). The transforming of the event notifications into a common base event format for a particular type of event is described in greater detail below in conjunction with FIG. 2. The event manager 109 can process the uniform event notifications to perform one or more actions in response to the events occurring.

There may be time sensitive actions that should performed when an infrastructure event occurs. For example, notifications can be sent, inventory data can be updated, workloads can be rebalanced, etc. Unlike traditional event handling solutions that may incur time delays between the occurrence of the event and the processing of event notifications and may cause time sensitive actions that should be performed within an allotted time from not being performed within the specified time, the event manager 109 can use the uniform event notifications to reduce the time from when an event occurs to processing an event notification to provide sufficient time for time sensitive actions to be performed within an allotted time. Unlike traditional solutions that have multiple event handlers for each of the different event formats, the event manager 109 can create and use a centralized event handler for event notifications for the same type of event. The event manager 109 can also use the common base formats for the event notifications to quickly and reliably provide accurate and up-to-date inventory data.

Figure 2:
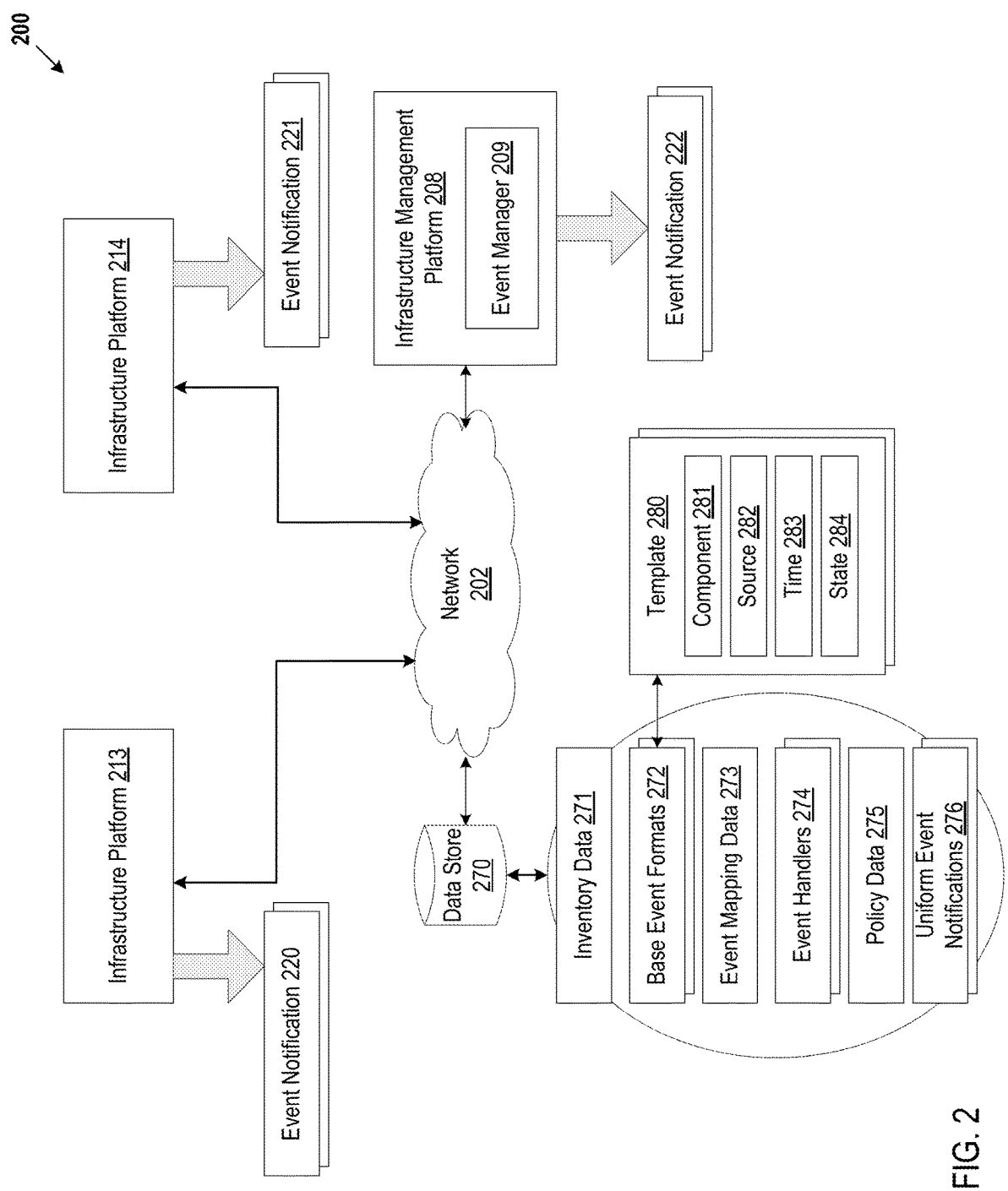
FIG. 2 illustrates an example of providing uniform event notifications for event notifications having different formats, in accordance with one or more implementations of the present disclosure.

FIG. 2 illustrates an example of providing uniform event notifications for event notifications having different formats, in accordance with one or more implementations of the present disclosure. Events can be triggered and event notifications can be generated to provide notice of when a change is made to a resource in an infrastructure platform. The infrastructure platforms 213,214 and infrastructure management platform 208 can generate event notifications 220-222 for the events. Notifications can be generated within a specified time from when a specific event happens. In one example, the infrastructure platforms and/or infrastructure management platform can generate the event notifications in JSON format, and place the event notifications in a message queue (e.g., AMQP queue) or an event queue. In another example, the infrastructure platforms and/or infrastructure management platform can format the event notifications into ATOM format and publish the event notifications as a feed.

The event manager 209 receive the event notifications 220,221 from the infrastructure platforms 213,214 by monitoring one or more message buses, message queues, event buses, and/or event queues of the infrastructure platforms 213,214 via a network 202. The event manager 209 can raise its own events and generate event notifications 222, for example, in response to detecting an event notification 220,221 from the infrastructure platforms 213,214. For example, a virtual machine in infrastructure platform 213 may have been powered off and the event manager 209 may have detected the event notification 220 for the power off event on the message bus of the infrastructure platform 213. The event manager 209 can raise its own event, such as, a generic power off event and generate an event notification 222 for the generic power off event to trigger action(s) to be performed.

Some infrastructure platforms can emit two event notifications for an individual task. For example, one event notification can be generated at the beginning of a lengthy task, such as instance create, and another event notification can be generated upon successful completion of the task. Notifications can contain metadata, such as event name, and message identifier, and a payload that includes data pertaining to the event. The event notification can have a format that depends on the particular infrastructure platform or infrastructure management platform that created the event notification.

The event notifications 220-222 that are from the various sources (e.g., infrastructure platforms 213,214 and infrastructure management platform 209) can have formats that are different from each other. For example, the event notifications can have different naming conventions, metadata, parameters, etc. The different formats for the event notifications is described in greater detail below in conjunction with FIG. 3. There are different types of events, such as, power-on events, power-off events, create resource events, retire resource events, resource maintenance events, etc. The event manager 209 can define a base event format 272 for each event type and convert the event notifications 220-222 from the different sources for a particular event type into uniform event notifications having the same base event format 272. For example, the event manager 209 can define a base event format for a power-on event type, a base event format for a power-off event type, a base event format for a create resource event type, a base event format for a retire resource event type, a base event format for a resource maintenance event type, etc.

The base event formats 272 can be defined and implemented as corresponding templates 280 that are stored in the data store 270. The templates 280 contain placeholders for parameters, such as, a component parameter 281, a source parameter 282, a time parameter 283, and a state parameter 284. The individual parameters can include a flat set of key-value pairs.

The event manager 209 can create and maintain event mapping data 273 for associating event notifications 220-222 with base event formats 272 and templates 280. The event mapping data 273 can include a list of event types and pointers to the corresponding base event formats 272 and templates 280. The event manager 209 can extract the event type from the event notifications 220-222 and use the event mapping data 273 to select the base event format 272 and template 280 that corresponds to the event type. The event manager 209 can extract data from the event notifications 220-222 and populate the parameters placeholders for values in the key-value pairs in the templates 280 with values from the data that is extracted from the event notifications 220-222 to create corresponding uniform event notifications 276. The uniform event notifications 276 can be stored in the data store 270.

Unlike conventional event management solutions that include a separate event handler for each event type for each event source (e.g., cloud, data center, infrastructure management platform), the architecture 200 includes a centralized event handler 274 for each event type that is used for any event source. The centralized event handler 274 for a particular event type can process events of that event type that occur from any event source. The event manager 209 can create a centralized event handler 274 for each event type and corresponding base event format 272. The individual centralized event handlers 272 can process the uniform event notifications 276 to perform one or more actions (e.g., send a notifications, trigger a workflow, update inventory data 271, etc.). A centralized event handler 274 for a particular event type can be an instance having methods that perform the actual granular actions for processing an event of that event type. The centralized event handler 274 can be a function or method containing program statements that are executed in response to an event occurring from any event source. The input for the centralized event handler 274 can be one or more values in the key-values pairs in the uniform event notifications 276. The centralized event handler 274 can use the input to perform one or more actions.

The infrastructure management platform 208 can create and maintain inventory data 271 for the resources in the infrastructure platforms 213,214. The inventory data 271 can be stored in one or more data stores (e.g., data store 270). The inventory data 271 can be used to track the individual resources of each cluster in the infrastructure platforms 213,214. The inventory data 271 can include resource identifiers, the resource type (e.g., bare metal system, host machine, VM, container, storage server, storage device, virtual storage device, etc.), cluster identifiers, the type of cluster, data indicating the state of a resource, data indicating whether a resource is a provisioned resource, data indicating whether a resource is a non-provisioned resource, data indicating which cluster a resource is assigned to, etc. A non-provisioned resource is a resource that is not assigned to a cluster. The event manager 209 can create a centralized event handler 209 for updating the inventory data 271 using the uniform event notifications, as described in greater detail in conjunction with FIG. 5.

Figure 3:
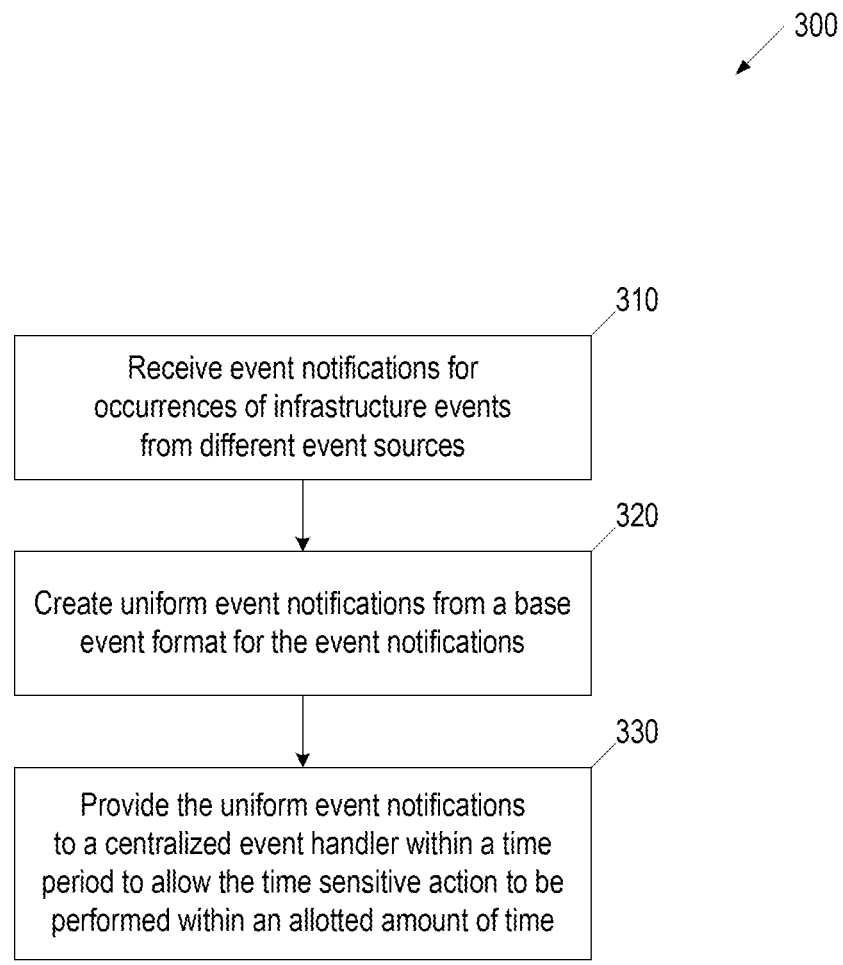
FIG. 3 is a flow diagram for a method for providing uniform event notifications to perform a time sensitive action, in accordance with one or more implementations of the present disclosure.

FIG. 3 is a flow diagram for a method 300 for providing uniform event notifications to perform a time sensitive action, in accordance with one or more implementations of the present disclosure. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a resource evaluator (e.g., event manager 109 of FIG. 1, event manager 209 of FIG. 2) executed by a processing device in a computing machine. At least a portion of method 300 can be performed automatically by the computing machine without user interaction.

At block 310, the processing device receives event notifications for occurrences of infrastructure events from different event sources. The different event sources can include clouds, data centers, and an infrastructure management platform. An event notification can include an event name and a payload that has data describing the event. The event notifications can be for the same event type and can have different formats. For example, the event notifications can be for a start virtual machine event and can have different naming conventions, formats, parameters, etc. For example, Cloud-Provider-A may start a VM in Cloud-A and Cloud-Provider-B may start a VM in Cloud-B. The processing device can receive event notifications for the same type of event (e.g., start virtual machine) from the cloud providers. The event notification from Cloud-Provider-A that can include an event name "PowerOnVMTask" in upper case letters and lower case letters. The event notification from Cloud-Provider-B for the event for starting VM that can include an event name "STARTINGVM" in all upper case letters and can have a payload that is different than the payload in the event notification from Cloud-Provider-A.

At block 320, the processing device creates uniform event notifications from a base event format for the event notifications. The processing device can determine the event type for the individual event notifications from the content (e.g., event name) of the event notifications.

Figure 4:
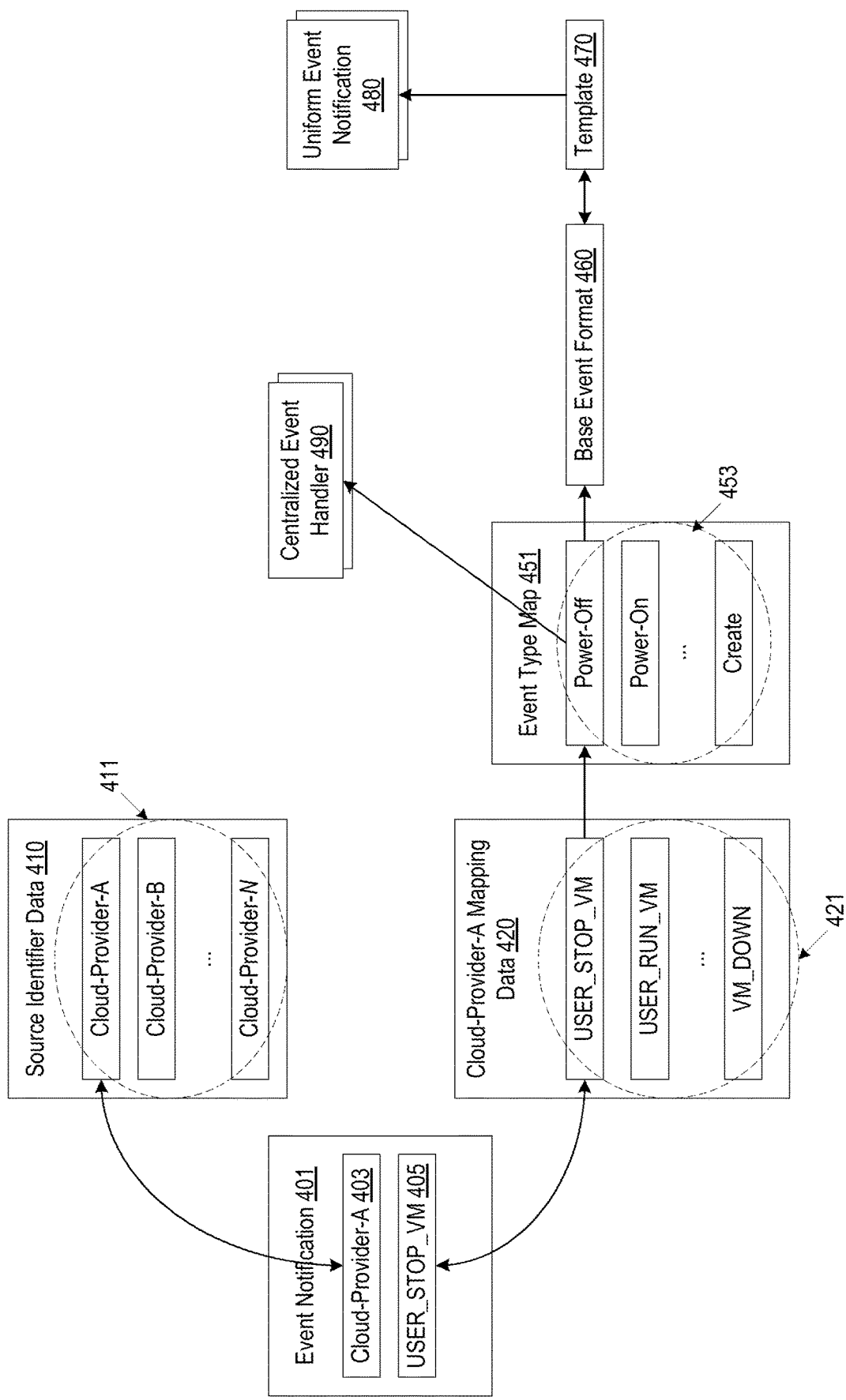
FIG. 4 illustrates an example of creating uniform event notifications for event notifications having different formats, in accordance with one or more implementations of the present disclosure.

FIG. 4 illustrates an example of creating uniform event notifications for event notifications having different formats, in accordance with one or more implementations of the present disclosure. The processing device can search an event notification 401 to determine the source 403 of the respective event and use the source to determine the event type. The source 403 can be an identifier of an infrastructure platform or an identifier of the infrastructure management platform. The processing device can access source identifier data 410, which is stored in data store, that can specify one or more keywords to search for in the event notification 401 for determining the source of the respective event. The keywords 411 can include at least a portion of various identifiers of cloud providers (e.g., Cloud-Provider-A, Cloud-Provider-B), at least a portion of various identifiers of data center providers (e.g., DataCenter-Provider-A, Data-Center-Provider-B), and/or at least a portion of an identifier of an infrastructure management platform. The source identifier data 410 can be configurable and/or user-defined. For example, the processing device may use the keywords 411 to search the event notification 401 and may determine that the source 403 of the event notification 401 is Cloud-Provider-A.

The processing device can use the source 403 (e.g., Cloud-Provider-A) to determine the event type of the event notification 401. The processing device can access mapping data 420 (e.g., Cloud-Provider-A mapping data) for the particular source that can specify one or more keywords 421 to search for in the event notification 401 for determining the event type of the respective event. The keywords 421 can include at least a portion of various event identifiers (e.g., names) for the particular source. The processing device may determine that the search returned "USER_STOP_VM", and the processing device may determine from the mapping data 420 for Cloud-Provider-A that the event type for the event notification 401 is a power-off event type 453. The mapping data 420 (e.g., Cloud-Provider-A mapping data) for the source (e.g., Cloud-Provider-A) can have a pointer for each keyword that points to a corresponding map event names to event type in an event type map 451.

The processing device can access the event type map 452 that maps event types to base event formats, and use the event type (e.g., power-off event type 453) to select the corresponding base event format 460. The processing device can parse the event notification 401 to extract values for populating parameter placeholders (e.g., component, source, time, state, etc.) in a template 470 for the base event format 460 to create a uniform event notification 480 corresponding for the event notification 401. The event type map 451 can include pointers that map the base event formats to template.

The event type map 451 can include pointers that map the individual event types to one or more centralized event handlers (e.g., Power-Off-Event-Handler 490) that can process the uniform event notifications for the event type. The centralized event handlers can be created based on policy data (e.g., policy data 275 in FIG. 2). The centralized event handlers can be functions or methods containing program statements that are executed in response to an event.

The processing device can receive a large number of event notifications and an group event notifications that are of the same type together and the event notifications that are for the same event type to the common centralized event handler for processing. For example, the processing device may send event notifications that are of a power-off event type to the Power-Off-Event-Handler 490.

The processing device can determine one or more time sensitive actions to be performed in response to event of a particular event type occurring from policy data. A time sensitive action is an action that should be performed within a specified time period. The policy data can also specify a time period for performing the action(s). Examples of time sensitive actions can include updating inventory data, updating data presented in a graphical user interface (GUI) of the infrastructure management platform, sending a notification (e.g., email) to a system and/or a user to indicate the occurrence of a particular event, triggering a work flow (e.g., load balancing work flow), etc.

Referring to FIG. 3, at block 330, the processing device provides the uniform event notifications to a centralized event handler that corresponds to the base event format within a threshold amount of time to allow a time sensitive action to be performed within the time period. The processing device can cause the centralized event handler to perform the time sensitive action (e.g., send notification, trigger workflow, update data, etc.). The processing device can access event mapping data in a data store to determine which centralized event handler to use to process the uniform event notifications. For example, the processing device may determine that the centralized handler Power-Off-Handler should be used to process the uniform event notifications for the power-off event type. One or more actions (e.g., send notification, trigger workflow, update data, etc.) to be performed and the time period(s) for performing the action(s) can be pre-defined in the centralized event handler.

Figure 5:
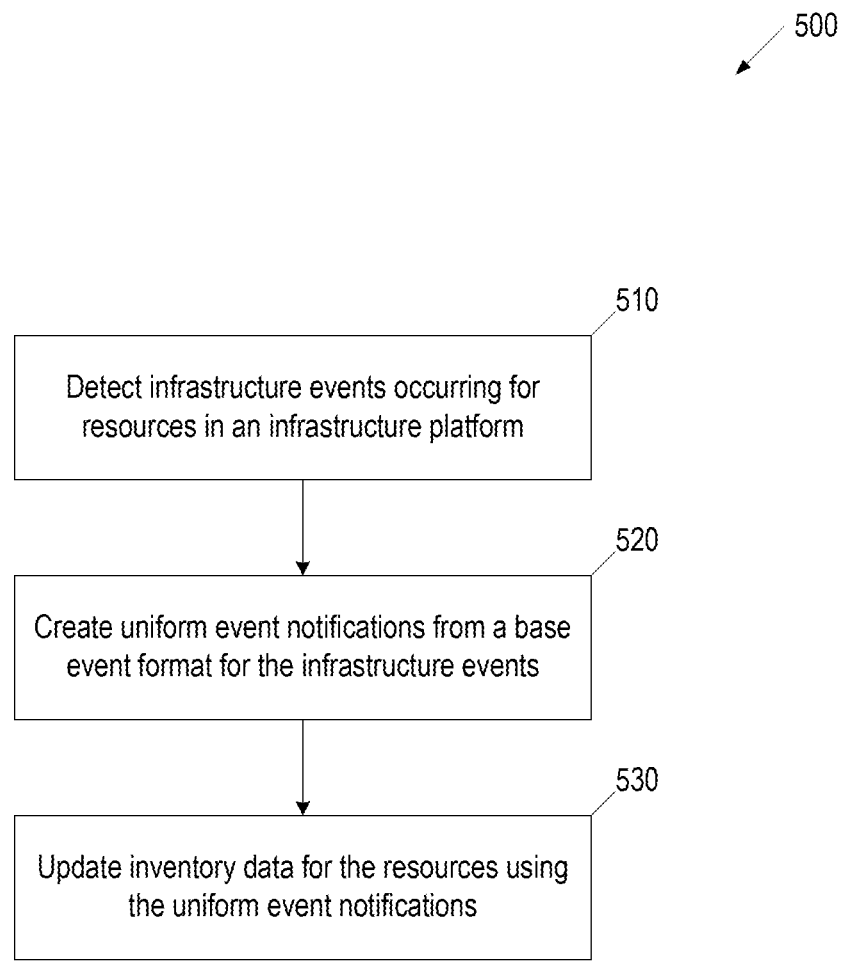
FIG. 5 is a flow diagram for a method for updating inventory data of an infrastructure platform using event notifications, in accordance with one or more implementations of the present disclosure.

FIG. 5 is a flow diagram for a method 500 for updating inventory data of an infrastructure platform using event notifications, in accordance with one or more implementations of the present disclosure. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a resource evaluator (e.g., event manager 109 of FIG. 1, event manager 209 of FIG. 2) executed by a processing device in a computing machine. At least a portion of method 500 can be performed automatically by the computing machine without user interaction.

At block 510, the processing device detects infrastructure events occurring for resources in an infrastructure platform. The processing device can monitor a message bus, message queue, event bus, and/or event queue for event notifications to detect the occurrence of infrastructure event. The processing device can receive the event notifications for the infrastructure events. The events can include states changes that are made to the corresponding resources. Examples of states changes can include changes to the power of the resource, changes indicating whether a resource is running or suspended, changes indicating whether a resource is created or deleted, changes indicating whether a resource is started or stopped, changes indicating whether a resource is provisioned or de-provisioned, etc.

At block 520, the processing device creates uniform event notifications from a base event format for the infrastructure events. The processing device can group together event notifications for the same type of event. For example, processing device can group together event notifications from various infrastructure platforms and/or the infrastructure management platforms for a power-on event. The event notifications for the same type of event may have native formats, native naming conventions, and native parameters that are different from each other. The processing device can select a base event format, and corresponding template, for the event type (e.g., power-on event), and create uniform event notifications that correspond to the event notifications that have native formats that are different from each other. The uniform event notifications can have a consistent format, as defined by the based event format and implemented by the template. The uniform event notifications can include data indicating the state changes for the corresponding resources.

At block 530, the processing device updates inventory data for the resources using the state changes for the individual resources in the uniform event notifications. The processing device can execute an inventory event handler to extract values pertaining to the state changes in each of the uniform event notifications and update the inventory data using the values from the uniform event notifications. The inventory data can be stored, for example, as a database in a data store. Each uniform event notification can include a source identifier, component (e.g., resource) identifier, and a state change identifier and/or data describing the state change. The processing device can extract the source identifier and/or component (e.g., resource) identifier and use the identifier(s) to locate an entry in the inventory data, and can update the state in the entry based on an extracted state change identifier and/or the extracted data describing the state change from the uniform event notification.

For example, the processing device can receive an event notification for a power operation event that may occur for a particular VM in Cloud-A, which changes the state of the VM from an OFF state to an ON state. The processing device can create a corresponding uniform event notification that includes a source identifier for Cloud-A, a component (e.g., resource) identifier for the particular VM, and a state change identifier and/or data describing the state change of power OFF to power ON. The processing device can use the source identifier for Cloud-A and/or component identifier for the particular VM to locate an entry in the inventory data for the particular VM, and can update the state in the entry for the particular VM to indicate the state change from power OFF to power ON. For example, the processing device may change a power state indicator (e.g., flag) in the entry.

Figure 6:
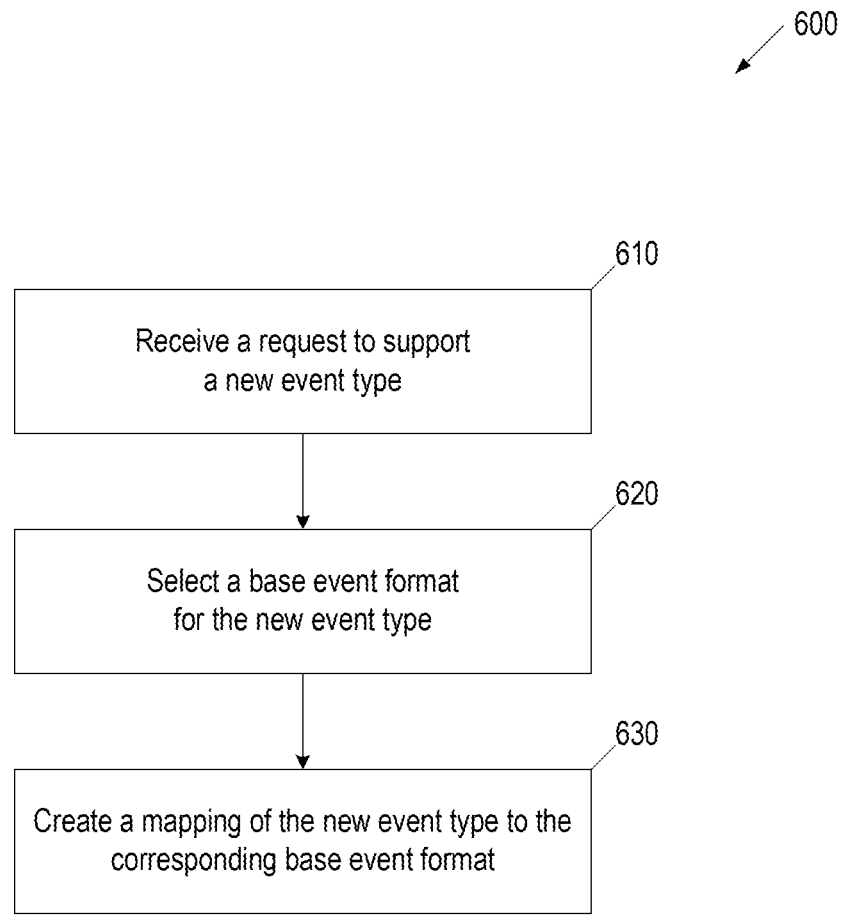
FIG. 6 is a flow diagram for a method for providing a centralized event handler for event notifications having different formats, in accordance with one or more implementations of the present disclosure.

FIG. 6 is a flow diagram for a method 600 for providing a centralized event handler for event notifications having different formats, in accordance with one or more implementations of the present disclosure. Method 600 can be performed by processing logic that can comprise hardware (e.g., circuitry, dedicated logic, programmable logic, microcode, etc.), software (e.g., instructions run on a processing device), or a combination thereof. In one implementation, method 600 is performed by a resource evaluator (e.g., event manager 109 of FIG. 1, event manager 209 of FIG. 2) executed by a processing device in a computing machine. At least a portion of method 600 can be performed automatically by the computing machine without user interaction.

At block 610, the processing device receives a request to support a new event type. A significant number of events and event notifications can be generated by the infrastructure platforms and infrastructure management platform. Some events have a greater importance for processing than other events. For example, events that are related to changing a state of a resource are of particular interests to users (e.g., system administrators) of the infrastructure platforms and/or infrastructure management platform. For example, Cloud-Provider-A may produce 40,000 different event types and corresponding event notifications, and users may be interested in having the infrastructure create uniform event notifications for 100 event types. Examples of events that pertain to a state change can include creating a resource, provisioning a resource, de-provisioning a resource, running a resource, suspending a resource, performing maintenance on a resource, etc. Events that are of lesser importance for processing can include events that do not pertain to a state change of a resource. An examples of an event that may not pertain to a state change can include the assignment of a networking address to a network card.

The request can be for an event type that is not currently being converted into a uniform event notification. For example, the system administrators of Cloud-Provider-A may request uniform event notification support for networking assignment event types. In another example, the infrastructure management platform may support a new infrastructure platform. For example, Cloud-X being provided by Cloud-Provider-X may be added to the infrastructure management platform and the request may be to support event types for events being generated by Cloud-X.

The request can include a source identifier (e.g., source identifier for Cloud-X), event name(s) and/or event naming conventions, resource identifiers and/or resource identifier conventions, one or more keywords that should be used for mapping the event type(s), for example, to a base event format for the respective event type and/or a centralized event handler for the respective event type.

At block 620, the processing device selects a base event format for the new event type. The processing device can determine whether an existing base event format is stored in a data store that can correspond to the new event type. For example, the new event type may be a power-on event type for Cloud-X, and there may be an existing based event format for a power-on event type in the data store.

If there is not an existing base event format that can correspond to the new event type, the processing device can define a new base event format and create a corresponding template for the new base event format. The processing device can define a new base event format based on user input (e.g., system administrator) that is received. The user input can specify one or more parameters (e.g., source identifier, component identifier, state, time) that should be included in the base event format.

At block 630, the processing device creates a mapping of the new event type to the corresponding base event format. The processing device can create the mapping by adding data to the event mapping data (e.g., event mapping data 273 in FIG. 2) that is stored in a data store. The event mapping data can include a list of event types. Each event type in the mapping data can include a list of event identifiers (e.g., event names), which the infrastructure platforms and/or infrastructure management platform may use in the event notifications. For example, the event mapping data may include the event type "Power-Off" and may include the event name "compute.instance.power_off.end," which corresponds to Cloud-Provider-A. The new event type may be a power-off event from Cloud-Provider-X, which uses the event name "USER_STOP_VM" in event notifications for powering off a VM. The processing device can add "USER_STOP_VM" to the event type "Power-Off" in the event mapping data to map the new event type from Cloud-Provider-X to the corresponding base event format.

The base event format can have a corresponding template, which the processing device can use to create uniform event notifications for the new event type. The uniform event notifications can be used as input to one or more centralized event handlers that can perform one or more actions (e.g., update inventory data, update the state in a GUI, send a notification, trigger a workflow, etc.) in response to occurrences of events for the new event type.

Figure 7:
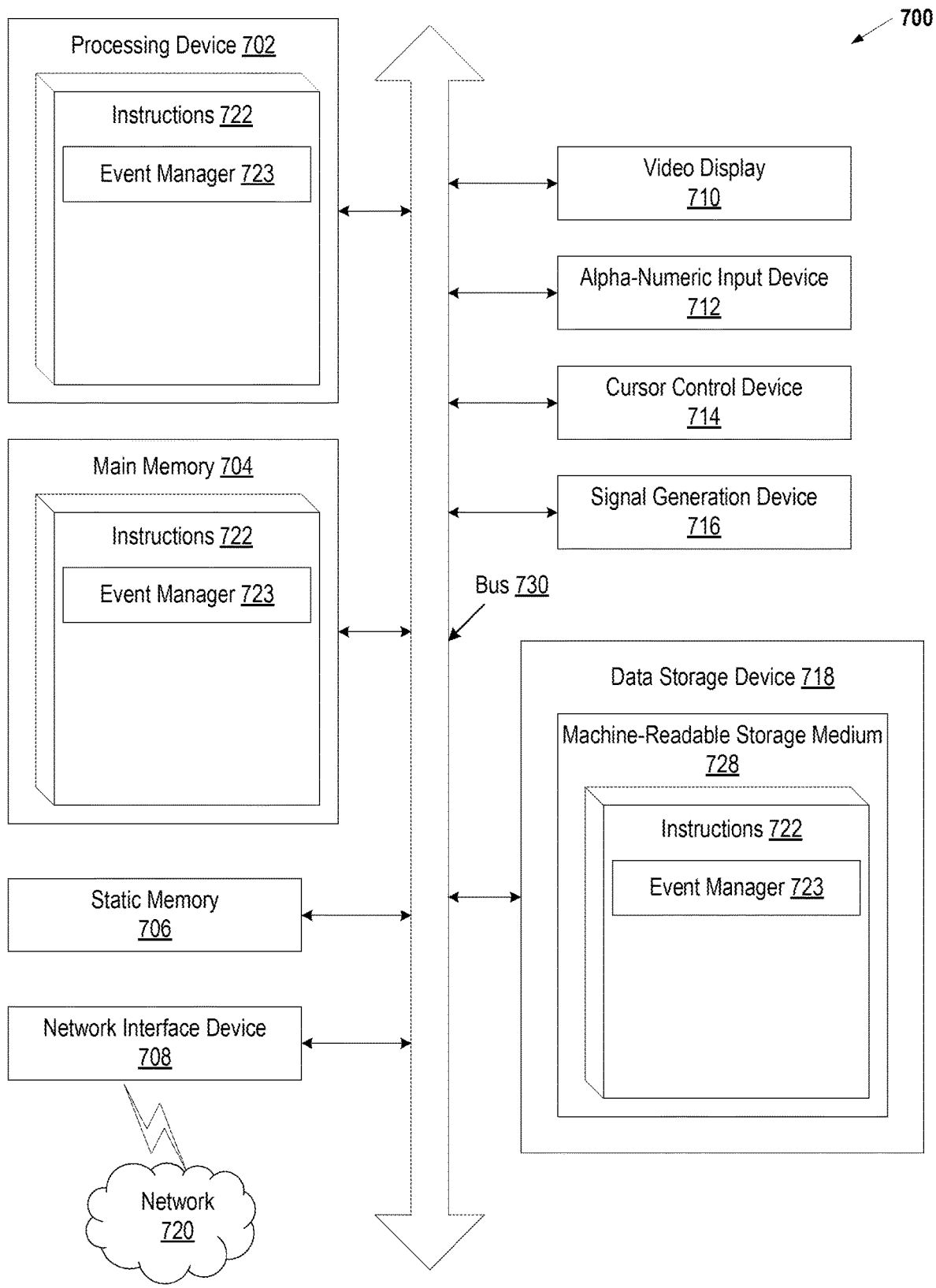
FIG. 7 is a block diagram of an example computer system that may perform one or more of the operations described herein.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data store device 618, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 608. The computer system 700 also may include a video display unit 710 (e.g., a liquid crystal display (LCD) or a cathode ray tube (CRT), an alphanumeric input device 712 (e.g., a keyboard), a cursor control device 714 (e.g., a mouse), and a signal generation device 716 (e.g., speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for an event manager 723 (e.g., event manager 109 of FIG. 1, event manager 209 of FIG. 2), and/or a software library containing methods that call the event manager 723. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "creating" or "providing" or "determining" or "identifying" or "selecting" or "detecting" or "updating" or "extracting" or "populating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
maintaining, by a processing device of an infrastructure management platform, mapping data for associating event notifications with a plurality of base event formats, wherein each base event format of the plurality of base event formats is associated with creation of corresponding uniform event notifications for a corresponding type of infrastructure event, wherein the mapping data comprises:
for each event source of infrastructure events, a mapping of types of the infrastructure events generated by a corresponding event source to respective ones of the plurality of base event formats; and
an association of each of the plurality of base event formats to respective centralized event handlers that process respective base event formats for the types of the infrastructure events;
receiving a plurality of event notifications for a plurality of occurrences of the infrastructure events from a plurality of different event sources, the plurality of event notifications comprising different formats to represent a same type of infrastructure event;
selecting, using the mapping data, a first base event format corresponding to the same type of infrastructure event from the plurality of base event formats, wherein the first base event format is to normalize the plurality of event notifications that are for the same type of infrastructure event;
creating a plurality of uniform event notifications by transforming the plurality of event notifications in view of the first base event format;
identifying, using the mapping data, a centralized event handler that corresponds to the first base event format; and
providing, by the processing device, the plurality of uniform event notifications to the centralized event handler that corresponds to the first base event format within a threshold amount of time to allow a time sensitive action to be performed by the centralized event handler within a time period.

2. The method of claim 1, wherein the time sensitive action comprises at least one of updating inventory data, updating data presented in a graphical user interface (GUI) of the infrastructure management platform, sending a notification to indicate occurrence of a particular event, or triggering a work flow.

3. The method of claim 1, wherein the centralized event handler can perform the time sensitive action in response to receiving an event notification from any of the plurality of different event sources.

4. The method of claim 1, wherein creating the plurality of uniform event notifications comprises:
identifying a template corresponding to the first base event format in view of the mapping data; and
creating, for each of the plurality of event notifications, a corresponding uniform event notification by populating the template with data from a corresponding event notification from the plurality of event notifications.

5. The method of claim 1, further comprising:
receiving a request to support a new type of infrastructure event;
selecting a second base event format for the new type of infrastructure event; and
creating a mapping of the new type of infrastructure event to the second base event format.

6. The method of claim 1, wherein the plurality of different event sources comprises the infrastructure management platform, and at least one of the plurality of event notifications is generated by the infrastructure management platform.

7. The method of claim 1, wherein the plurality of different event sources comprises at least one of a plurality of different cloud providers, a plurality of different data center providers, or a cloud provider and a data center provider.

8. A non-transitory computer-readable storage medium including instructions that, when executed by a processing device, cause the processing device to:
maintain, by the processing device of an infrastructure management platform, mapping data for associating event notifications with a plurality of base event formats, wherein each base event format of the plurality of base event formats is associated with creation of corresponding uniform event notifications for a corresponding type of infrastructure event, wherein the mapping data comprises:
for each event source of infrastructure events, a mapping of types of the infrastructure events generated by a corresponding event source to respective ones of the plurality of base event formats; and
an association of each of the plurality of base event formats to respective centralized event handlers that process respective base event formats for the types of the infrastructure events;
detect a plurality of the infrastructure events occurring for a plurality of resources in a plurality of infrastructure platforms managed by the infrastructure management platform, the plurality of the infrastructure events comprising state changes for the plurality of resources, wherein a plurality of event notifications correspond to the plurality of the infrastructure events, wherein the plurality of event notifications comprise different formats to represent a same type of infrastructure event;
select, using the mapping data, a first base event format corresponding to the same type of infrastructure event from the plurality of base event formats, wherein the first base event format is to normalize the plurality of event notifications that are for the same type of infrastructure event;
create a plurality of uniform event notifications by transforming the plurality of event notifications in view of the first base event format, the plurality of uniform event notifications comprising data indicating state changes for the plurality of resources in a common base event format;
identify, using the mapping data, a centralized event handler that corresponds to the first base event format;
providing, by the processing device, the plurality of uniform event notifications to the centralized event handler that corresponds to the first base event format within a threshold amount of time to allow a time sensitive action to be performed by the centralized event handler within a time period; and
update, by the processing device, inventory data representing the plurality of resources in the plurality of infrastructure platforms using the state changes in the plurality of uniform event notifications.

9. The non-transitory computer-readable storage medium of claim 8, wherein to update the inventory data, the processing device is to:
extract a plurality of values pertaining to the state changes in each of the plurality of uniform event notifications; and
update the inventory data using the plurality of values from the plurality of uniform event notifications.

10. The non-transitory computer-readable storage medium of claim 8, wherein the processing device is to update the inventory data within a pre-defined time limit.

11. The non-transitory computer-readable storage medium of claim 8, wherein the state changes comprise at least one of creating a resource, deleting a resource, starting a resource, suspending a resource, stopping a resource, provisioning a resource, or de-provisioning a resource.

12. The non-transitory computer-readable storage medium of claim 8, wherein at least one of the plurality of the infrastructure events is generated by the infrastructure management platform.

13. The non-transitory computer-readable storage medium of claim 8, wherein to create the plurality of uniform event notifications, the processing device is to:
receive the plurality of event notifications corresponding to the plurality of the infrastructure events;
extract a plurality of values from the plurality of event notifications; and
populate a template with the plurality of values to create the plurality of uniform event notifications.

14. A system comprising:
a memory; and
a processing device operatively coupled to the memory, to:
maintain mapping data for associating event notifications with a plurality of base event formats, wherein each base event format of the plurality of base event formats is associated with creation of corresponding uniform event notifications for a corresponding type of infrastructure event, wherein the mapping data comprises:
for each event source of infrastructure events, a mapping of types of the infrastructure events generated by a corresponding event source to respective ones of the plurality of base event formats; and
an association of each of the plurality of base event formats to respective centralized event handlers that process respective base event formats for the types of the infrastructure events;
receive a plurality of event notifications for a plurality of occurrences of the infrastructure events from a plurality of different event sources, the plurality of event notifications comprising different formats to represent a same type of infrastructure event;
select, using the mapping data, a first base event format corresponding to the same type of infrastructure event from the plurality of base event formats, wherein the first base event format is to normalize the plurality of event notifications that are for the same type of infrastructure event;
create a plurality of uniform event notifications by transforming the plurality of event notifications in view of the first base event format;
identify, using the mapping data, a centralized event handler that corresponds to the first base event format; and
provide the plurality of uniform event notifications to the centralized event handler that corresponds to the first base event format within a threshold amount of time to allow a time sensitive action to be performed by the centralized event handler within a time period.

15. The system of claim 14, wherein the time sensitive action comprises at least one of updating inventory data, updating data presented in a graphical user interface (GUI) of an infrastructure management platform, sending a notification to indicate occurrence of a particular event, or triggering a work flow.

16. The system of claim 14, wherein the centralized event handler can perform the time sensitive action in response to receiving an event notification from any of the plurality of different event sources.

17. The system of claim 14, wherein to create the plurality of uniform event notifications, the processing device is to:
identify a template corresponding to the first base event format in view of the mapping data; and
create, for each of the plurality of event notifications, a corresponding uniform event notification by populating the template with data from a corresponding event notification from the plurality of event notifications.

18. The system of claim 14, wherein the processing device is further to:
receive a request to support a new type of infrastructure event;
select a second base event format for the new type of infrastructure event; and
create a mapping of the new type of infrastructure event to the second base event format.

19. The system of claim 14, wherein the plurality of different event sources comprises an infrastructure management platform system, and at least one of the plurality of event notifications is generated by the infrastructure management platform system.

20. The system of claim 14, wherein the plurality of different event sources comprises at least one of a plurality of different cloud providers, a plurality of different data center providers, or a cloud provider and a data center provider.

* * * * *